United States Patent
Wong

(10) Patent No.: US 7,134,038 B2
(45) Date of Patent: Nov. 7, 2006

(54) COMMUNICATION CLOCKING CONVERSION TECHNIQUES

(75) Inventor: Wee Mon Wong, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/140,056

(22) Filed: May 27, 2005

(65) Prior Publication Data
US 2005/0223261 A1    Oct. 6, 2005

Related U.S. Application Data

(63) Continuation of application No. 09/989,267, filed on Nov. 20, 2001, now Pat. No. 6,928,573.

(51) Int. Cl.
*G06F 1/08*    (2006.01)
(52) U.S. Cl. .................... 713/600; 713/500; 326/93
(58) Field of Classification Search ................ 713/600, 713/500; 326/93; 327/176
See application file for complete search history.

(56) References Cited

U.S. PATENT DOCUMENTS 3,631,426 A *  12/1971  Appelt et al. ................. 360/47
4,607,345 A     8/1986  Mehta
5,425,062 A     6/1995  Boop
5,706,438 A     1/1998  Choi et al.
6,018,305 A *   1/2000  Kikuchi et al. ............. 341/100
6,480,512 B1   11/2002  Ahn \* cited by examiner

*Primary Examiner*—Thuan Du
(74) *Attorney, Agent, or Firm*—McAndrews, Held & Malloy, Ltd.

(57) ABSTRACT

A plurality of groups of first flip-flops (group 40 of flip-flops A1–An–1 for each of channels CIA–CIC) store input data clocked in response to first clock signals (A–C). First enable signals (Stack_en) are generated for each group of first flip-flops. A plurality of groups of second flip-flops (group 60 of flip-flops B1–Bn for each of channels CIA–CIC) store the input data from the first flip-flops in response to the first enable signals and first clock signals. A second enable signal (Slide_en) is generated in response to a second clock signal (D) and the first enable signal. A plurality of groups of third flip-flops (group 80 for each of channels CIA–CIC) store the data in response to the second enable signal and second clock signal. The data is transmitted in serial form at the rate of the second clock signal.

20 Claims, 4 Drawing Sheets

COMMUNICATION CLOCKING CONVERSION TECHNIQUES

CROSS-REFERENCE TO RELATED APPLICATION

This application is a continuation of U.S. application Ser. No. 09/989,267 filed Nov. 20, 2001 now U.S. Pat. No. 6,928,573, which is hereby incorporated herein by reference in its entirety.

BACKGROUND OF THE INVENTION

This invention relates to clocking conversion in communication systems, and more particularly relates to converting data clocked within a first speed range to data clocked within a higher speed range or within the same speed range.

Many applications in digital communication systems require converting a slower input clock rate to a higher system clock rate to increase performance. When two independent clocks are present in a design or system, there will always be an unknown phase difference between the two clock sources. When the independent clocks operate at different frequencies, the frequency difference will cause the clocks to move in both time and phase relationship to each other. Traditionally data synchronization in such systems requires extra memory in the form of an asynchronous FIFO or a ping-pong buffer with complex control logic. This invention addresses these deficiencies of the traditional approaches and provides a solution.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful for converting serial data clocked in response to a first clock signal having cycles occurring at a first rate to serial data clocked in response to a second clock signal having cycles occurring at a second rate, the second rate being equal to or greater than the first rate. In such an environment, the apparatus comprises first flip-flops arranged to store the data clocked in response to the first clock signal. A first signal generator responsive to the first clock signal is arranged to generate a first enable signal after a predetermined number of cycles of the first clock signal dependant on the number of first flip-flops.

Second flip-flops responsive to the first enable signal and the first clock signal are arranged to store the data. A second signal generator is arranged to generate a second enable signal in response to the second clock signal and the first enable signal. Third flip-flops are arranged to store the data in response to the second enable signal and the second clock signal. A multiplexer is arranged to transmit the data in serial form from the third flip-flops at the second rate.

One method embodiment of the invention is useful for converting serial data clocked in response to a first clock signal having cycles occurring at the first rate to serial data clocked in response to a second clock signal having cycles occurring at a second rate, the second rate being equal to or greater than the first rate. In such an environment, the method comprises storing the data clocked in response to the first clock signal. A first enable signal is generated after a predetermined number of cycles of the first clock signal dependant on the number of bits of the data stored. The data is stored in response to the first enable signal and the first clock signal. A second enable signal is generated in response to the second clock signal and the first enable signal. The data is stored in response to the second enable signal and the second clock signal. The data is transmitted in serial form at the second rate in response to the second clock signal.

A second apparatus embodiment of the invention is useful in a data communication system comprising a plurality of channels receiving serial input data clocked in response to a plurality of first clock signals having cycles occurring at a plurality of different first rates. In such an environment, serial input data can be converted to serial data clocked in response to a second clock signal having cycles occurring at a second rate, the second rate being equal to or greater than each of the first rates, by apparatus comprising a plurality of groups of first flip-flops arranged to store the input data clocked in response to the first clock signals, each group of first flip-flops corresponding to one of the channels. A first signal generator responsive to the first clock signals generates first enable signals, each first enable signal corresponding to one group the first flip-flops. A plurality of groups of second flip-flops responsive to the first enable signals and the first clock signals store the input data, each group of second flip-flops corresponding to one group of the first flip-flops. A second signal generator responsive to the second clock signal and at least one of first enable signals generates a second enable signal. A plurality of groups of third flip-flops responsive to the second enable signal and the second clock signal store the input data, each group of third flip-flops corresponding to one group of second flip-flops. A multiplexer is arranged to transmit the input data in serial form from the third flip-flops at the second rate.

A second method embodiment of the invention is useful in a data communication system comprising a plurality of channels receiving serial input data clocked in response to a plurality of first clock signals having cycles occurring at a plurality of different first rates. In such an environment, serial input data can be converted to serial data clocked in response to a second clock signal having cycles occurring at a second rate, the second rate being equal to or greater than each of the first rates, by a method comprising storing the input data clocked in response to the first clock signals separately for each channel. First enable signals are generated in response to the first clock signals, each first enable signal corresponding to one of the channels. The input data are stored in response to the first enable signals and the first clock signals separately for each channel. A second enable signal is generated in response to the second clock signal and at least one of first enable signals. The input data are stored in response to the second enable signal and the second clock signal separately for each channel. The stored input data are transmitted in serial form at the second rate.

By using the foregoing techniques, data can be converted to a higher rate with a degree of reliability and ease previously unavailable. For applications in which the data is received in multiple channels at different clock rates, only one second clock signal is needed for all channels.

These and other advantages and novel features of the present invention, as well as details of an illustrated embodiment thereof, will be more fully understood from the following description and drawings.

DETAILED DESCRIPTION OF THE INVENTION

Figure 1:
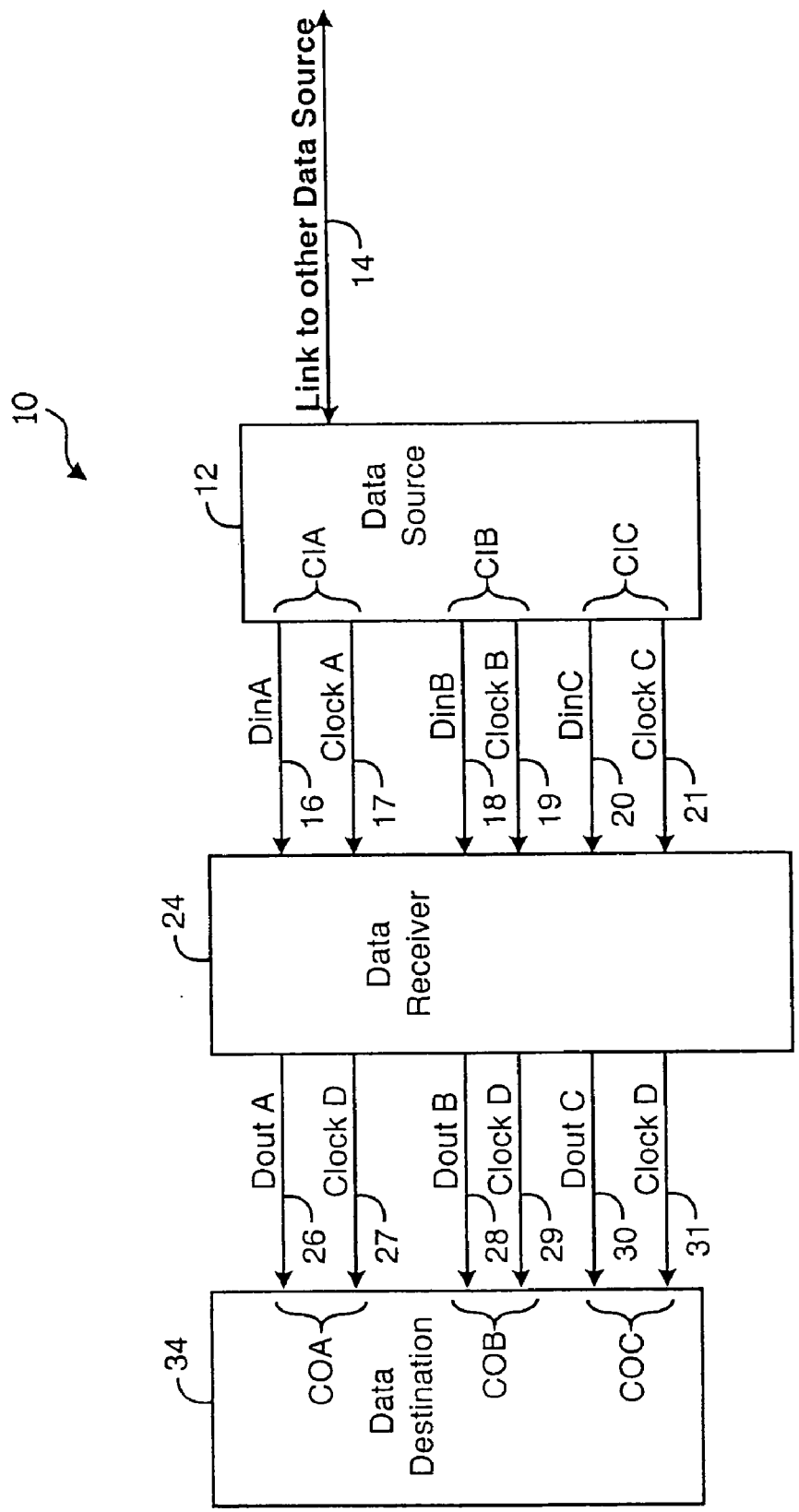
FIG. 1 is a schematic block diagram of one embodiment of the invention employing a data receiver receiving multiple input data channels clocked a different clock rates.

Referring to FIG. 1, a communication system 10 includes a data source 12, which provides data over multiple input channels CIA, CIB and CIC through communication lines 16–21 to a data receiver 24. At least some of the channels may be clocked at different rates. For example, input channel CIA transmitted over lines 16 and 17 provides data DinA on line 16 that is clocked by a clock signal A on line 17. Input channel CIB transmitted over lines 18 and 19 provides data DinB on line 18 that is clocked by a clock signal B on line 19. Input channel CIC transmitted over lines 20 and 21 provides data DinC on line 20 that is clocked by a clock signal C on line 21. Data source 12 may be linked to other data sources over a communication link 14 as shown.

Once a data link is established, data source 12 transmits data DinA together with clock signal A, data DinB, together with clock signal B, and data DinC, together with clock signal C. The rate of DinA, DinB, DinC, clock signal A, clock signal B and clock signal C vary depending on the transmission rate of the data source. For example, the rates of the transmission rates of the data on lines 16–21 could range from 4 Mbits/sec to 25 Mbits/sec.

Receiver 24 converts the data to a clock rate that is higher than or equal to the rates of clock signals A–C. The converted data is transmitted over output channels COA, COB and COC on lines 26–31 to a data destination 34. Typically, receiver 24 uses a single clock signal D to transmit the data over output lines 26–31. Typically the rate of clock signal D is fixed as determined by the system clock of data destination 34. For example, receiver 24 and data destination 34 may be operating at 50 MHz in order to increase the performance: Thus, clock signal D would have clock cycles occurring at the rate of 50 MHz. However, clock signals A–C typically have cycles that occur at lower rates. For example, clock signals A–C may have rates that are one-half to one-quarter of the rate of clock signal D. It is therefore necessary that data receiver 24 convert the input clock rates of clock signals A–C to the output clock rates of clock signal D.

Output channel COA transmitted over lines 26 and 27 provides data DoutA on line 26 that is clocked by clock signal D on line 27. Output channel COB transmitted over lines 28 and 29 provides data DoutB on line 28 that is clocked by clock signal D on line 29. Output channel COC transmitted over lines 30 and 31 provides data DoutC on line 30 that is clocked by clock signal D on line 31. Out put channels COA, COB and COC correspond with input channels CIA, CIB and CIC, respectively.

Figure 2:
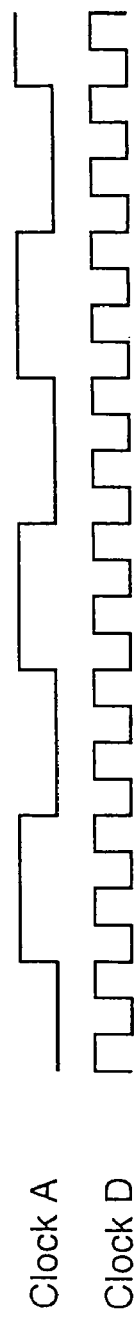
FIGS. 2–4 are timing diagrams showing exemplary relationships between the rates of clock signals useable in the embodiment shown in FIG. 1.
Figure 3:
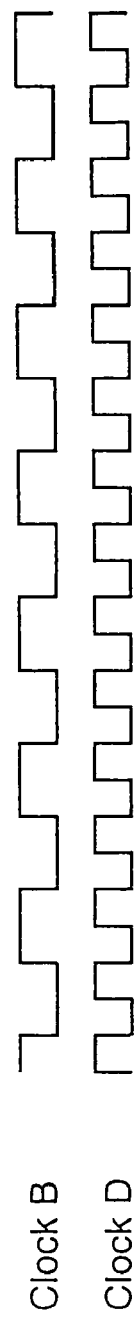
Figure 4:
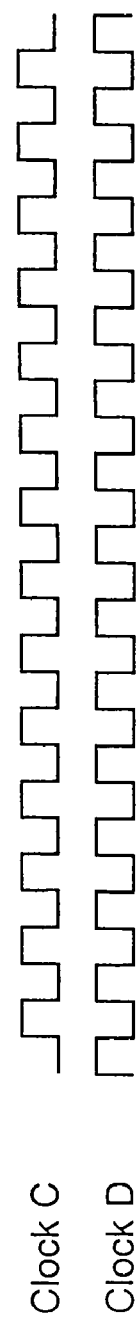

FIG. 2 illustrates the case in which the cycles of clock signal D occur at four times the rate of the cycles of clock signal A. FIG. 3 illustrates the case in which the cycles of clock signal D occur at two times the rate of the cycles of clock signal B. FIG. 4 illustrates the case in which the cycles of clock signal D occur at the same rate as the cycles of clock signal C. Although no phase difference is shown between the signals in FIGS. 2–4, in practice, there may be phase differences. The illustrated embodiment of the invention automatically compensates for any such phase differences.

Figure 5:
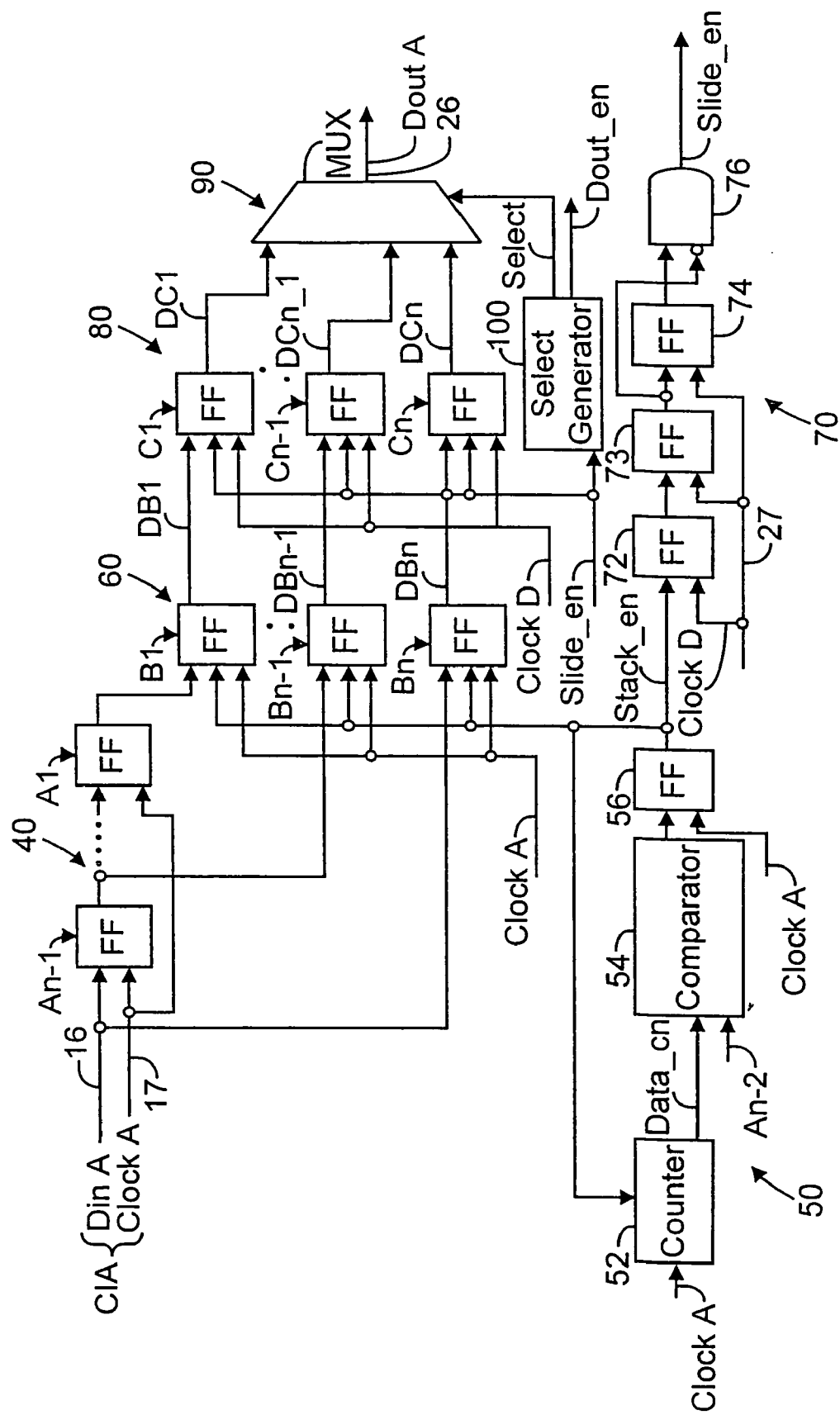
FIG. 5 is a schematic block diagram of the circuitry used in one channel of the data receiver shown in FIG. 1.

FIG. 5 illustrates one embodiment of circuitry within receiver 24 that processes the data received on input channel CIA and generates the data transmitted on output channel COA. Circuitry identical to the circuitry shown in FIG. 5 also is provided for channels CIB and CIC. The circuitry for channels CIB and CIC can be understood from the following description of the circuitry for channel CIA.

Still referring to FIG. 5, in general, input data is pipelined in a serial chain of n flip-flops. Once n number of input data bits is reached, the piped-lined data is then "pushed down" to another group of flip-flops according to the input clock. In the mean time, the stacked data is caused to "slide out" into a group of flip-flops, which are later read with system clock signal D. The value n depends on the difference between system clock frequency D and maximum input clock frequency.

Still referring to FIG. 5, asynchronous serial data DinA received on line 16 is pipe-lined through and serially stored in a group 40 of flip-flops A1 to An−1 over about n−1 cycles of clock signal A. In the mean time, a signal generator 50, including a counter 52, a comparator 54 and a flip-flop 56, detects the number of data bits pipe-lined into the chain of flip-flops A1 . . . An−1 by counting cycles of clock signal A. Once the number of input data bits reaches n−1, a Stack_en enable signal is generated as a logical high signal, and counter 52 is reset to zero. The Stack_en signal enables a second group 60 of flip-flops B1 . . . Bn. The current DinA data bit is registered into flip-flop Bn and the DA1 . . . DAn−1 data bits (i.e., the data bits stored in flip-flops A1 . . . An−1) are stored in flip-flops B1 . . . Bn−1, respectively, in response to the Stack_en signal and clock signal A.

The value of n depends on the difference between the maximum rate of clock signals A–C and the rate of clock D. For example, assuming that the rate of clock signal A is the maximum of the rates of clock signals A–C, n will be 3, if the rate of clock signal D is greater than or equal to the maximum rate of clock signal A and the rate of clock signal D is less than the two times the maximum rate of clock signal A. If the rate of clock signal D is greater than or equal to the two times the maximum rate of clock signal A and the rate of Clock D is less than four times the maximum rate of clock signal A, n will be 2.

A signal generator 70 uses three flip-flops 72–74, a logic gate 76, the Stack_en signal and clock signal D to generate enable signal Slide_en, which enables a group 80 of flip-flops C1 . . . Cn. The outputs DB1 . . . DBn of flip-flops B1 . . . Bn connect to the inputs of flip-flops C1 . . . Cn. The outputs DC1 . . . DCn of flip-flops C1 . . . Cn are connected to the input of a multiplexer 90. The Slide_en signal also enables a select generator 100 to generate Select and Dout_en signals. The Select signal causes multiplexer 90 to transmit the bit stored in flip-flop C1 first and the bit stored in flip-flop Cn last. Thus, data is read from outputs DC1 through DCn one-bit-at-a-time in succession.

Figure 6:
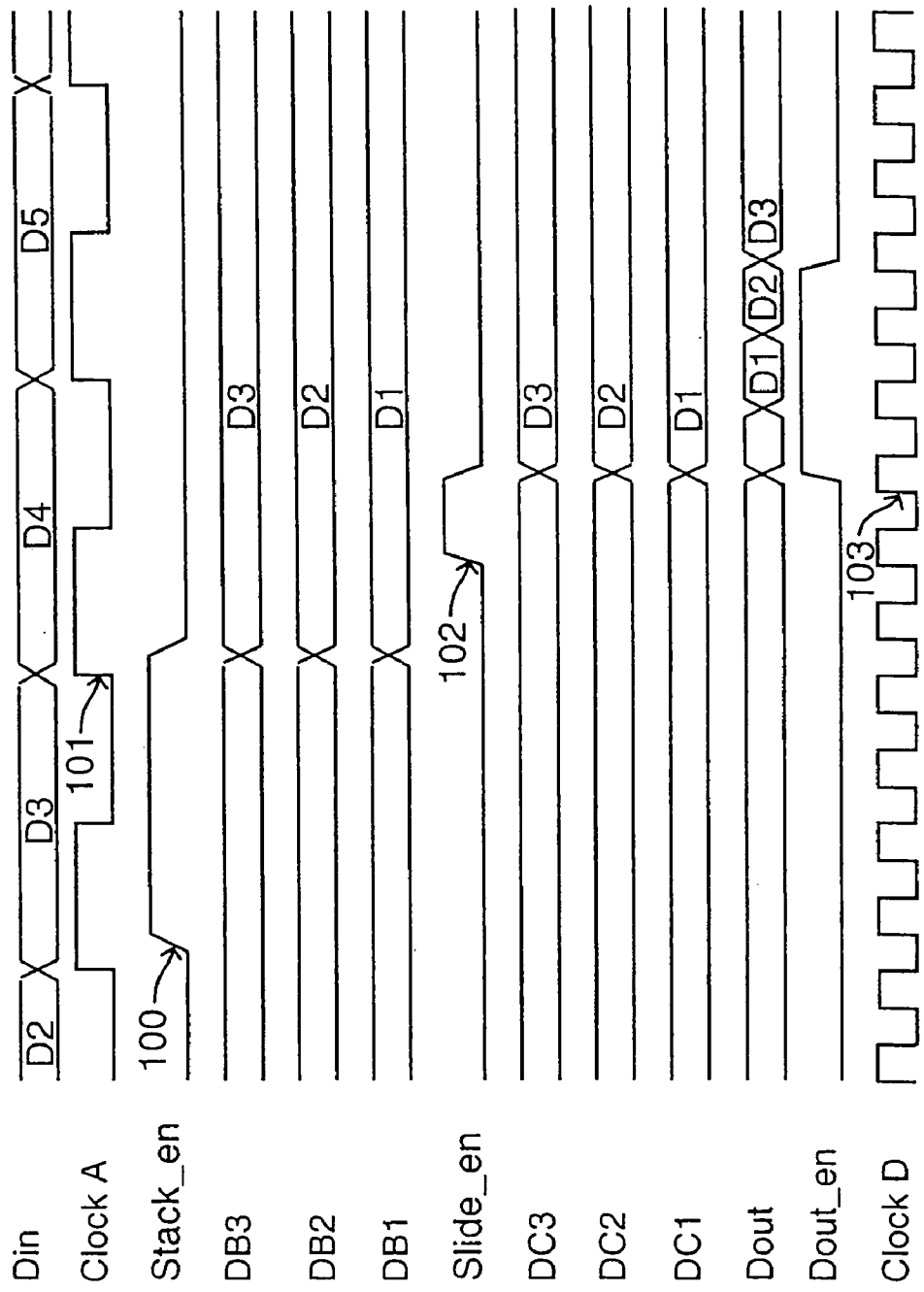
FIG. 6 is a timing diagram showing the signals appearing at various points in the circuitry shown in FIG. 5.

Assume n is 3. For the examples shown in FIGS. 2–4, n is 3 or less. Referring to FIGS. 5–6, the Stack_en signal 100 is high when Din is D3. The data stored in flip-flops A1, A2, and the Din data bit are registered into flip-flops B1 . . . B3 at clock signal A cycle 101. That is, data is stored in group 60 flip-flops in a single cycle of clock signal A. Slide_en signal 102 is generated a few cycles of clock signal D after the beginning of clock signal A cycle 101. Slide_en signal 102 enables outputs DB1 . . . DB3 to "slide" to and be stored in flip-flops C1 . . . C3 of group 80 in response to clock D cycle 103. Thus, data is stored in flip-flops C1–Cn in response to a single clock cycle of clock signal D.

The outputs DC1 . . . DC3 of flip-flops C1 . . . C3 are multiplexed but by the Select signal, which is generated by select generator 100. The converted output data DoutA, together with the Dout_en signal, are used by the data destination 34 for further data processing.

Still referring to FIG. 6, the DinA data is clocked in response to the clock signal A and is stored serially in flip-flops A1 . . . An−1. Enable signal Stack_en is generated after a number of cycles of the clock signal A dependant on the number of bits of the data stored in flip-flops A1 . . . An−1. The data from flip-flops A1 . . . An−1 is stored in parallel in flip-flops B1–Bn in response to enable signal Stack_en and the clock signal A. Enable signal Slide_en is generated in response to clock signal D and enable signal Stack_en. The data stored in flip-flops B1 . . . Bn is stored in parallel in flip-flops C1–Cn in response to enable signal Slide_en and clock signal D. The data is transmitted in serial form through line 26 at the rate of clock signal D in response to clock signal D.

As previously stated, the circuitry shown in FIG. 5 is duplicated for channels CIB and CIC. However, clock signal A shown in FIG. 5 would become clock signal B for channel CIB and would become clock signal C for channel C. For some applications, clock signals D transmitted on lines 27, 29 and 31 may be transmitted on a single line.

For the example of data communication system 10 in which channels CIA–CIC receive serial input data clocked in response to clock signals A–C having cycles occurring at a plurality of different rates, the serial input data DinA–DinC is converted to serial output data DoutA–DoutC clocked in response to clock signal D having cycles occurring at a second rate, which is equal to or greater than each of the rates for clock signals A–C. A plurality of groups of first flip-flops (group 40 of flip-flops A1–An–1 for each of channels CIA–CIC) stores the input data clocked in response to clock signals (A–C). Each group of flip-flops A1–An–1 corresponds to one of channels CIA–CIC. Signal generators 50 for each of the channels are responsive to clock signals (A–C) to generate enable signals Stack_en for each of the channels and each of the groups of flip-flops A1–An–1. A plurality of groups of second flip-flops (group 60 of flip-flops B1–Bn for each of channels CIA–CIC) are responsive to the first enable signals Stack_en and the first clock signals (A–C) to store the input data. Each group of second flip-flops B1–Bn corresponds to one group of the first flip-flops A1–An–1. Signal generator 70 is responsive to clock signal D and at least one of first enable signals Stack_en for one of the channels to generate enable signal Slide_en. A plurality of groups of third flip-flops (group 80 of flip-flops C1–Cn for each of channels CIA–CIC) are responsive to enable signal Slide_en and clock signal D to store the input data. Each group of third flip-flops corresponds to one group of the second flip-flops. A plurality of multiplexers 90, one for each of the channels, are arranged to transmit the input data in serial form from the third flip-flops at the rate of clock signal D to output channels COA–COC. By using this arrangement, only one clock signal D needs to be generated for all of the channels.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A system for converting data rate, comprising:
   a first set of flip-flops configured in series;
   a second set of flip-flops configured in parallel and operatively coupled to the first set of flip-flops; and
   a third set of flip-flops configured in parallel and operatively coupled to the second set of flip-flops,
   wherein the first set of flip-flops is configured to store, in series, data in response to a first clock signal,
   wherein the second set of flip-flops is configured to store, in parallel, the stored data in the first set of flip-flops in response to the first clock signal,
   wherein the third set of flip-flops is configured to store, in parallel, the stored data in the second set of flip-flops in response to a second clock signal, and
   wherein the second clock signal has a faster clock rate than the first clock signal.

2. The system according to claim 1, comprising:
   a selector operatively coupled to the third set of flip-flops,
   wherein the selector serially outputs the stored data in the third set of flip-flops.

3. The system according to claim 2, wherein the selector serially output at a rate that is a function of the second clock signal.

4. The system according to claim 1,
   wherein the second clock signal comprises a local clock signal, and
   wherein the first clock signal comprises a transmitted clock signal.

5. The system according to claim 1, wherein the second set of flip-flops is configured to store, in parallel, the stored data in the first set of flip-flops in response to the first clock signal and an enable signal that is a function of the first clock signal.

6. The system according to claim 5, wherein the enable signal is the output of a signal generator.

7. The system according to claim 6,
   wherein the signal generator comprises a counter and a comparator,
   wherein the counter is operatively coupled to the comparator, and
   wherein the counter receives the first clock signal.

8. The system according to claim 7,
   wherein the signal generator comprises a flip-flop that is operatively coupled to the comparator, and
   wherein the flip-flop is configured to output the enable signal.

9. The system according to claim 1,
   wherein the third set of flip-flops is configured to store, in parallel, the stored data in the second set of flip-flops in response to a second clock signal and a first enable signal.

10. The system according to claim 9, wherein the first enable signal is the output of a signal generator.

11. The system according to claim 10,
    wherein the signal generator comprises a fourth set of flip-flops and a logic gate,
    wherein the fourth set of flip-flops is operatively coupled to the logic gate, and
    wherein the fourth set of flip-flops is configured in series.

12. The system according to claim 11,
    wherein the fourth set of flip-flops is configured to receive a second enable signal and the second clock signal.

13. The system according to claim 11,
    wherein the logic gate is configured to output the first enable signal.

14. The system according to claim 1, wherein the second set of flip-flops is configured to store, in parallel, the stored data in the first set of flip-flops in response to a single cycle of the first clock signal.

15. The system according to claim 1, wherein the third set of flip-flops is configured to store, in parallel, the stored data in the second set of flip-flops in response to a single cycle of the second clock signal.

16. The system according to claim 1, wherein the first set of flip-flops comprises a serial chain of flip-flops configured so that data can be stored in the serial chain of flip-flops in response to a plurality of cycles of the fast clock signal.

17. The system according to claim 1,
wherein input data is received serially by the first set of flip-flops at a first rate, and
wherein output data is transmitted serially from the third set of flip-flops at a second rate that is faster than the first rate.

18. The system according to claim 7, wherein the input data and the output data comprise same data at different rates.

19. A method for converting data rate, comprising:
storing, in series, data having a first data rate in a first set of flip-flops in response to a plurality of cycles of a first clock signal;
storing, in parallel, the stored data in the first set of flip-flops in a second set of flip-flops in response to the first clock signal;
storing, in parallel, the stored data in the second set of flip-flops in a third set of flip-flops in response to a second clock signal; and
transmitting, in series at a second data rate, the stored data in the third set of flip-flop in response to a signal that is a function of the second clock signal, the second data rate being higher than the first data rate.

20. A system for converting data rate of serial data, comprising:
first means for storing, in series, serial data having a first data rate in response to a plurality of cycles of a first clock signal;
second means for storing, in parallel, the stored data in the first means in response to the first clock signal;
third means for storing, in parallel, the stored data in the second means in response to a second clock signal; and
means for transmitting, in series, the stored data in the third means in response to a signal that is a function of the second clock signal, the transmitting means transmitting at a second data rate that is higher than the first data rate.

* * * * *

UNITED STATES PATENT AND TRADEMARK OFFICE
CERTIFICATE OF CORRECTION

PATENT NO. : 7,134,038 B2 Page 1 of 1
APPLICATION NO. : 11/140056
DATED : May 27, 2005
INVENTOR(S) : Wee Mon Wong It is certified that error appears in the above-identified patent and that said Letters Patent is hereby corrected as shown below:

Column 7, line 9 delete "7" and insert --17--.
Column 8, line 2 delete "flip-flop" and insert --flip-flops--

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,134,038 B2 | Page 1 of 1 |
| APPLICATION NO. | : 11/140056 | |
| DATED | : November 7, 2006 | |
| INVENTOR(S) | : Wee Mon Wong | |

It is certified that error appears in the above-identified patent and that said Letters Patent is hereby corrected as shown below:

Column 7, line 9 delete "7" and insert --17--.
Column 8, line 2 delete "flip-flop" and insert --flip-flops--

This certificate supersedes Certificate of Correction issued January 9, 2007.

Signed and Sealed this

Sixth Day of February, 2007

JON W. DUDAS
*Director of the United States Patent and Trademark Office*